A. H. MATTHEWS.
VISUAL TELEGRAPH SIGNAL.
APPLICATION FILED MAY 4, 1918.

1,413,049.

Patented Apr. 18, 1922.
4 SHEETS—SHEET 1.

Inventor
A. H. Matthews.
By Lancaster and Allwine
his Attorneys

A. H. MATTHEWS.
VISUAL TELEGRAPH SIGNAL.
APPLICATION FILED MAY 4, 1918.
1,413,049.  
Patented Apr. 18, 1922.
4 SHEETS—SHEET 2.
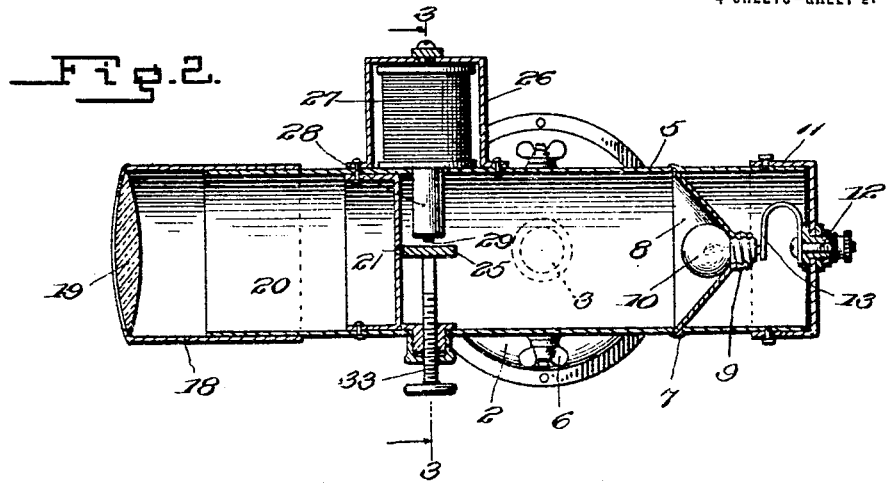
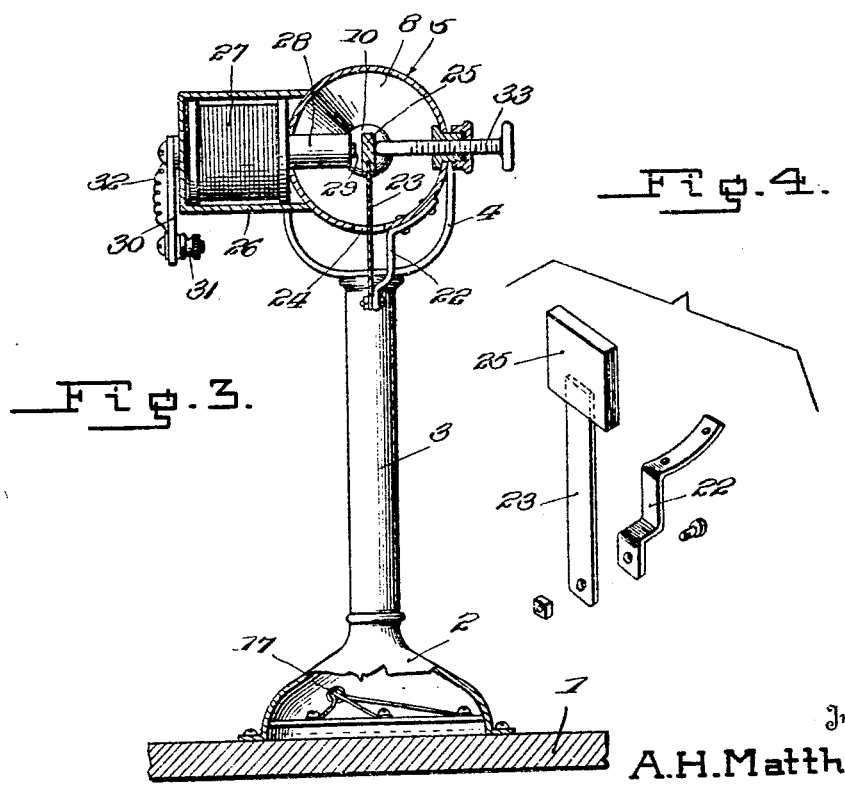
Inventor
A.H. Matthews.

A. H. MATTHEWS.
VISUAL TELEGRAPH SIGNAL.
APPLICATION FILED MAY 4, 1918.
1,413,049.
Patented Apr. 18, 1922.
4 SHEETS—SHEET 3.
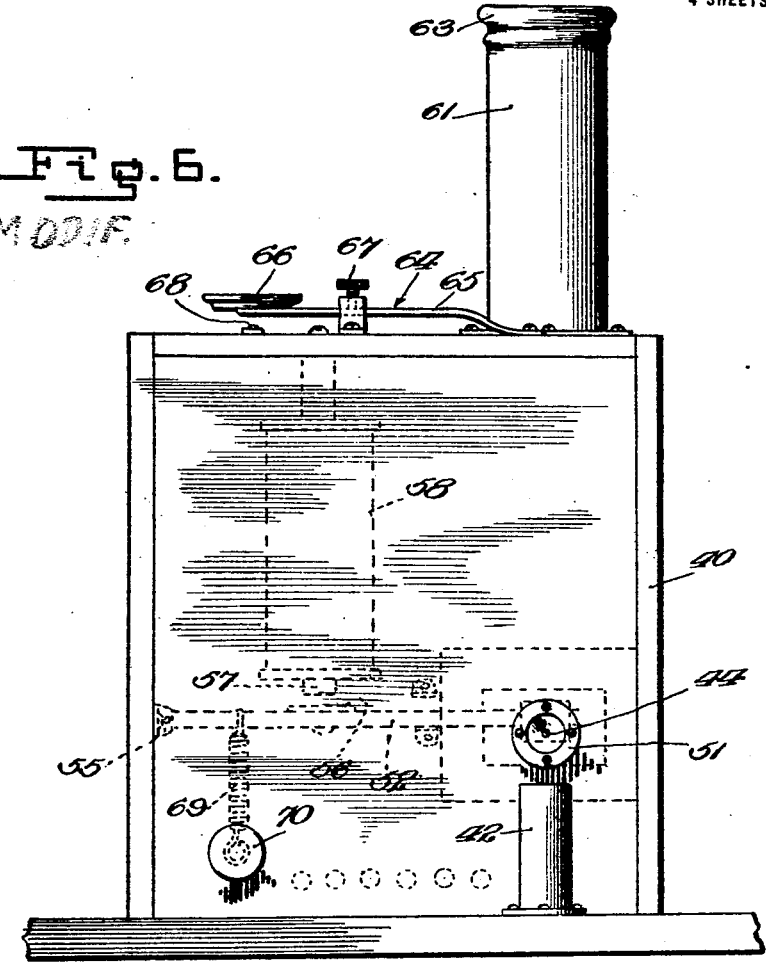
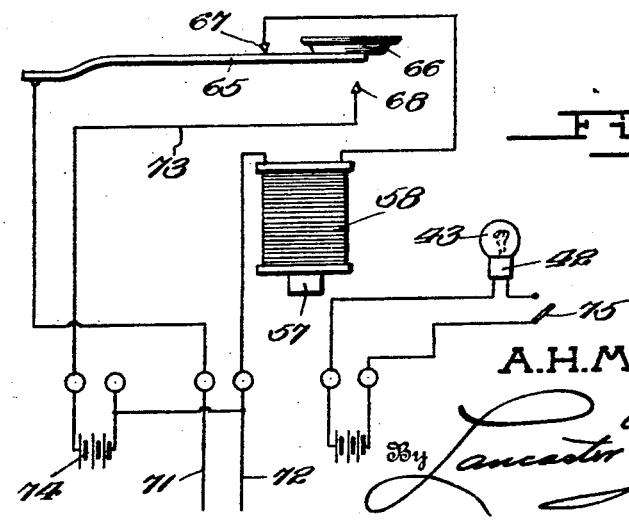
Inventor
A. H. Matthews.

A. H. MATTHEWS.
VISUAL TELEGRAPH SIGNAL.
APPLICATION FILED MAY 4, 1918.
1,413,049.       Patented Apr. 18, 1922.
4 SHEETS—SHEET 4.
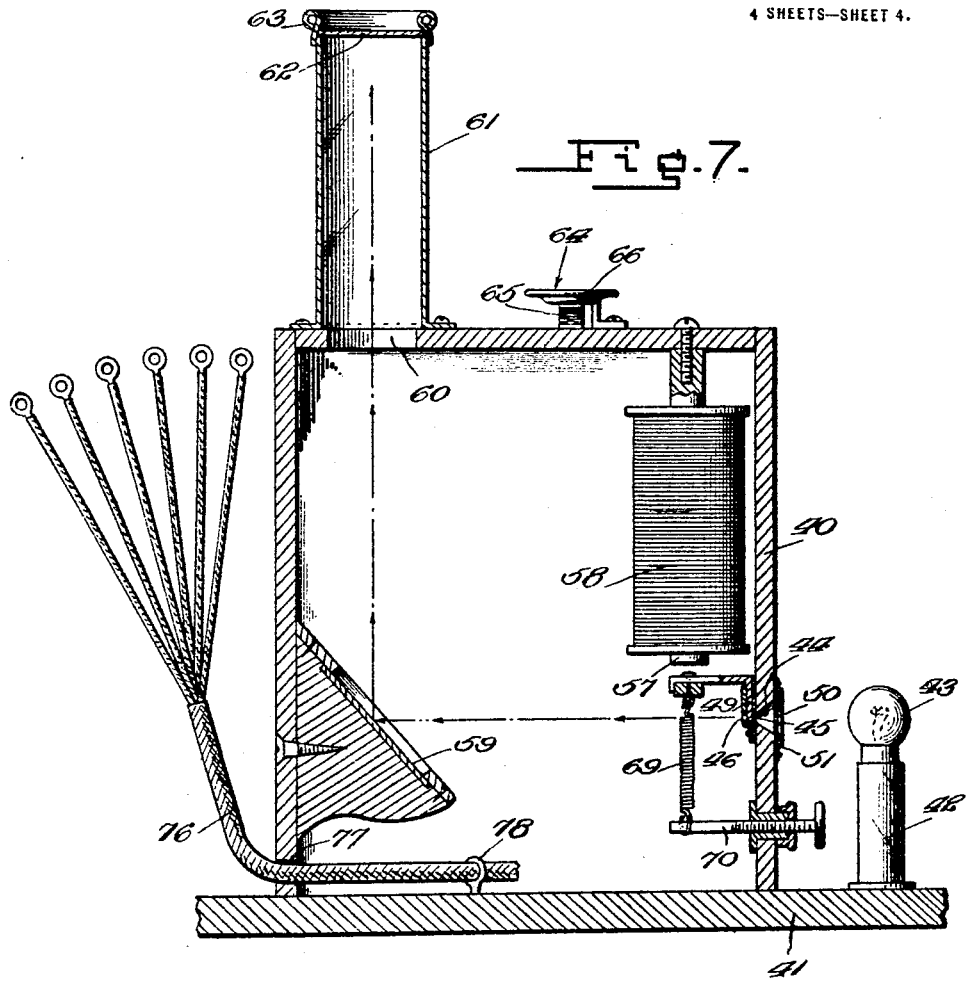
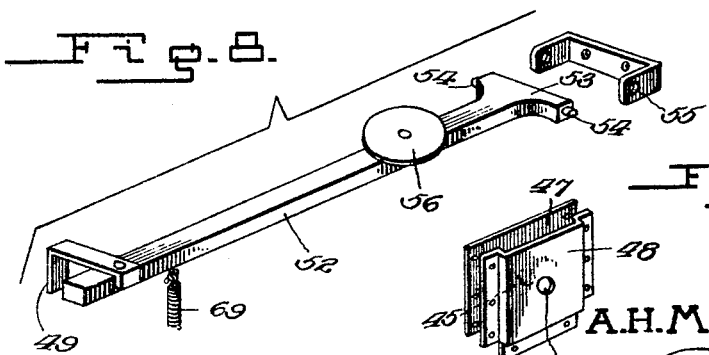
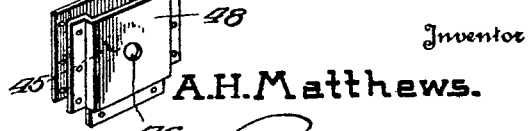
Inventor
A. H. Matthews.

UNITED STATES PATENT OFFICE.

ARTHUR H. MATTHEWS, OF LIMOILOU, QUEBEC, CANADA, ASSIGNOR OF ONE-HALF TO ROBERT H. DODDRIDGE, OF THE PROVINCE OF QUEBEC, CANADA.

VISUAL TELEGRAPH SIGNAL.

1,413,049.  Specification of Letters Patent.  Patented Apr. 18, 1922.

Application filed May 4, 1918. Serial No. 232,593.

*To all whom it may concern:*

Be it known that I, ARTHUR H. MATTHEWS, a citizen of Canada and a resident of Limoilou, in the Province of Quebec and Dominion of Canada, have invented certain new and useful Improvements in a Visual Telegraph Signal, of which the following is a specification.

This invention relates to telegraphy, and more particularly to a telegraph instrument adapted to transmit messages by flashes of light, in lieu of intermittent sounds, as commonly employed, utilizing any of the codes now in use, transmitting the various characters thereof by light flashes of different durations.

An object of this invention is to provide in a telegraph instrument as specified, light projecting means, a sight opening and a light guiding opening for guiding the light from the projecting means to the sight opening and further to provide an electro-magnet controlled member for controlling the passage of light through the guide opening, which will upon the energizing of the magnet, by the operation of a sender in circuit with the magnet be moved out of alignment with the light guiding opening to permit the passage of light therethrough to the sight opening.

A further object of the invention is to provide a telegraph instrument as specified, which includes means for limiting the vibratory or pivotal movement of the armature; to adjustably support the lens to permit of movement thereof towards or away from the light projecting means and to provide means to operate the armature to cut off the passage of light through the light guiding opening upon the de-energizing of the magnet.

Other objects of the invention will appear in the following detailed description, taken in connection with the accompanying drawings, forming a part of this specification, and in which drawings:

Figure 2 is a longitudinal horizontal section through the instrument.

Figure 3 is a section on the line 3—3 of Fig. 2.

Figure 4 is a detail perspective view of the armature and the support therefor.

Figure 6 is a side elevation of a modified form of the instrument.

Figure 7 is a vertical section through the modified form of the instrument.

Figure 8 is a detail perspective view of the pivotally mounted lever carrying the armature, of the modified form, and illustrating the support therefor.

Figure 9 is a detail perspective view of the shutter guide of the modified form.

Figure 10 is a diagrammatic view of the circuit of the modified form.

Figure 1:
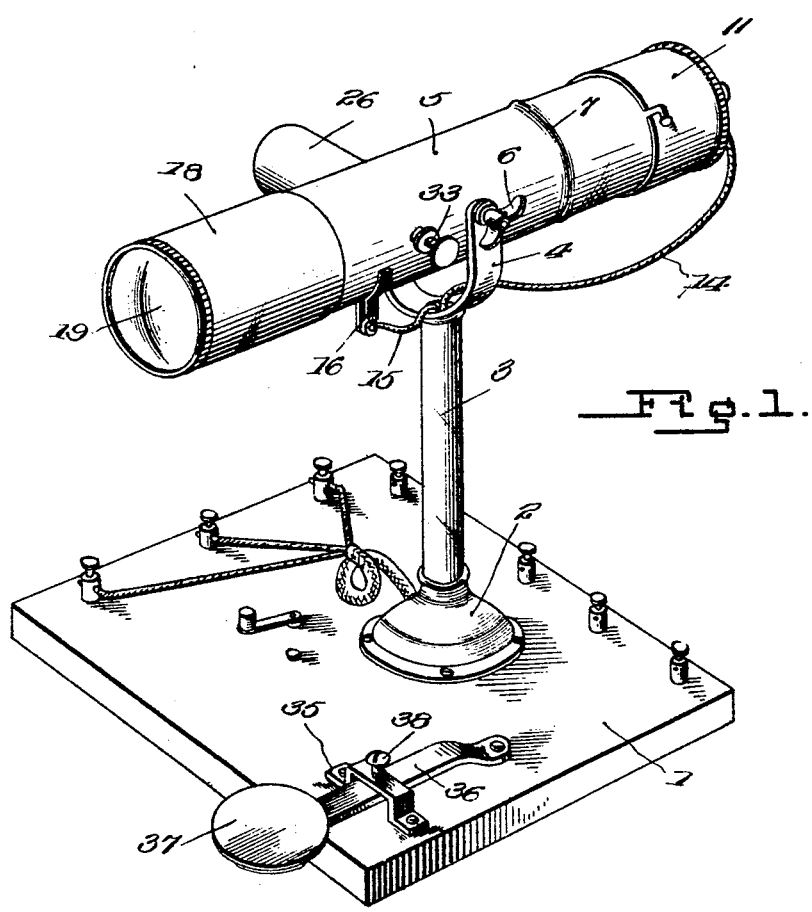
Figure 1 is a perspective view of the preferred form of the telegraph instrument.

Referring more particularly to the drawings, 1 designates the supporting board of the instrument structure, upon which is mounted the supporting base 2 of the instrument from which the standard 3 extends. The upper end of the standard 3 is forked, to provide a pair of spaced arms 4 to which the casing 5 of the preferred form of the instrument is pivotally connected. Wing nuts 6 are provided for holding the casing 5 at adjusted elevations with respect to its supporting arms 4.

The casing 5 is provided with an annular out-struck portion 7, near one end of the same in which the edge of a light reflector 8 engages. The reflector 8 has a lamp engaging socket 9 formed at the apex thereof into which socket is connected an ordinary incandescent electric light bulb 10.

A cap 11 is removably mounted over the end of the casing near which the out-struck portion 7 is formed and this cap carries a binding post 12 to the inner end of which a spring contact 13 is connected. The spring contact 13 engages the central contact of the light bulb structure and the current for operating the light 10 passes through the binding post 12 in the spring contact 13 from a wire 14 and from the casing 5 through the reflector 8 to the exterior contact of the light. The current is fed to the casing 5 from a wire 15 which is connected to the casing by a suitable binding structure 16. The wires 14 and 15 extend downwardly through the standard 3, out through an opening 17 in the base 2 and are connected to binding posts carried by the board 1.

A cap 18 is adjustably mounted upon the end of the casing 5 remote from the end upon which the cap 11 is mounted. A lens 19 is carried by the adjustably mounted cap 18 and by adjusting the cap upon the body 5 the distance between the lens and the light 10 may be regulated as necessary under different conditions, or as desired.

A partition 20 is positioned within the casing 5 between the light 10 and the lens 19 and this partition is provided with a light guiding opening 21 through which the light passes from the lamp 10 to the lens 19.

A bracket 22 is attached to the outer surface of the casing 5 and it has a spring arm 23 connected thereto, which arm extends upwardly through an opening 24 formed in the casing and has an armature 25 mounted upon its upper end which armature normally rests directly in front of the opening 21 and between the partition 20 and the lamp 10.

The casing 5 has an auxiliary transversely extending casing 26 carried thereby, in which is positioned an electro-magnet 27. The core 28 of the magnet 27 projects into the casing and has it inner end in close proximity to the armature 25, whereby the armature will be attracted upon the energizing of the magnet to move it out of alignment with the opening 21 to permit the rays of light from the lamp 10 to pass through the opening to and through the lens 19. A copper plug 29 is inserted in the end of the core 28 to prevent the armature from sticking or adhering to the core, after the de-energizing of the magnet. A fiber arm 30 is carried by the casing 26 and it has a binding post 31 connected thereto to which one of the feed wires of the magnet is connected. The binding post 31 is connected to the magnet through a relatively short feed wire 32.

A thumb screw 33 is adjustably carried by the casing 5 and the armature 25 engages the inner end of this thumb screw for limiting the movement of the armature upon the de-energizing of the magnet 27. The resiliency of the spring arm 23 is such, that upon de-energizing of the magnet this arm will move the armature 25 into its normal position in alignment with the opening 21 where it will remain until the magnet is again energized.

A sending key structure generically indicated by the numeral 35 is carried by the board 1 and it comprises a key 36 of spring or resilient material having a finger plate 37 attached to the free end thereof. The key structure 36 is the ordinary type now employed in telegraph instruments for sending messages, and it is to be understood that in use the instrument above described is placed in circuit with a sounding key similar to the key 36 and at a distant point on the line, to control the energizing of the magnet 27.

Figure 5:
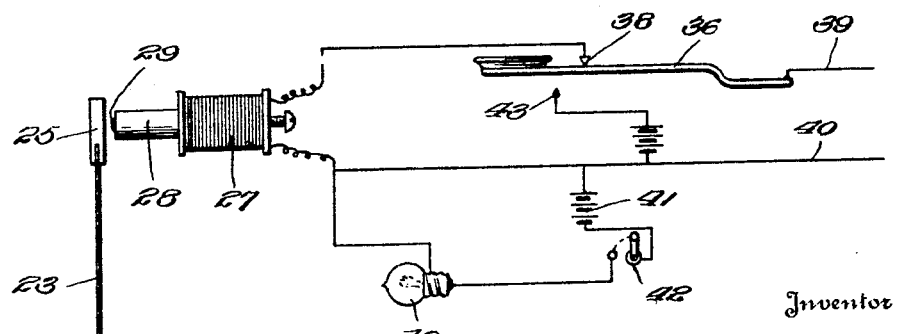
Figure 5 is a diagrammatic view of the circuit of the instrument.

With particular reference to Fig. 5 of the drawings: the key 36 normally rests in engagement with the contact 38, which connects the line wires 39 and 40 through the magnet 27 so that when a circuit is closed through these wires by the operation of the sending key at a similar station at the other end of the line, the magnet 27 will be energized for attracting the armature 25. The light bulb 10, is connected in a branch or separate circuit as shown in Fig. 5 of the drawings, which derives its power from a battery or exciter 41. A switch 42 is interposed in the light circuit for controlling the passage of current through the light bulb 10. To send a message, the key 36 is depressed, for engagement with the contact 43 which charge the circuit through the wires 39 and 40 and operates through the line wires in the ordinary manner of transmitting telegraphic messages.

In Figs. 6, 7, 8, 9 and 10 a modified form of the instrument is shown in which modified form a housing 40 is supported by a suitable supporting board or base 41. A lamp socket 42 is carried by the base 41 and an ordinary incandescent bulb 43 is positioned in the socket 42. The housing 40 is provided with an opening 44 formed therein in horizontal alignment with the bulb 43. The sides of the opening 44 converge as they extend inwardly and align with openings 45 and 46 formed in the rear and front guides 47 and 48 of the shutter 49.

A lens 50 is carried by the housing 40 and extends over the openings 44, being confined by a suitable holder structure 51.

The shutter 49 is carried by a lever 52 which lever has a head 53 formed upon the end remote from the shutter 49. The head 53 has trunnions 54 formed thereon which are rockably seated in the arms of a bracket 55 which bracket is attached to the interior of the housing 40 in any suitable manner. The connection between the trunnions 54 and the bracket 55 pivotally supports the lever 52. The lever 52 has an armature plate 56 attached thereto which is attracted by the core 57 of a solenoid or electro-magnet 58 for the energizing of the latter. The magnet 58 is supported within the housing 40 and is connected with the line wires of a telegraph system as shown in the diagrammatic Fig. 10. When the magnet 58 is energized, the armature 56 is attracted which moves the lever 52 upon its pivotal support, moving the shutter 49 upwardly from between the openings 44, 45 and the opening 46 allowing a beam of light to be projected through these openings from the bulb 43 or from the exterior of the housing 40 upon an angularly disposed mirror 59 which mirror deflects the beam of light upwardly through an opening 60 in the housing and through a suitable tube 61 to and through a lens 62 carried by the upper end of the tube 61. A flexible or soft cushion 63 is mounted about the upper or outer end of the tube 61 so as to prevent the abrasion of the face of an operator when he places his eye thereagainst to observe the light flashes emitted by the operation of the shutter 49.

A message sending key 64 is carried by the top of the housing 40 and it comprises the usual flexible arm 65 having the finger key 66 thereon and the upper and lower contacts 67 and 68.

A spiral spring 69 is connected to the lever 52 and to an adjustably mounted thumb screw 70. The thumb screw 70 is adjustably carried by the housing 40 to permit the adjustment thereon to regulate the tension of the spring 69. When the magnet 58 is de-energized, the spring 69 will move the lever 52 downwardly, for moving the shutter 49 between the openings 45 and 46 and cutting off the passage of a beam of light through these openings.

The flexible arm 65 of the key structure 64 normally engages the contact 67, which closes a circuit, through the line wires 71 and 72, and the magnet 58 to permit the energizing or exciting of this magnet upon the operation of a sending key at a distant point. When it is desired to send a message by the operation of the key 64, the depression of the key into engagement with the contact 68 will close the circuit through the wires 71 and 72, opening it through the manget 58, causing the current to pass through the wire 71, and through the wire 73, exciter 74 and the wire 72.

The lamp 43 is in a separate circuit from the magnet 58 and the lighting of the lamp is controlled by a switch 75.

The various current conducting wires of the instrument may be confined in a single casing 76 for entrance into the housing 40 through the opening 77. A suitable eye bolt 78 is carried by the base 41 and supports the wires and the casing 76 within the housing.

Having thus fully described the invention, what is claimed is:

1. In an optical telegraph, the combination, of light projecting means, a lens, a wall between said light projecting means and lens and provided with a light directing opening, a spring arm, an armature carried by said spring arm and normally preventing the passage of light through said opening, an electro-magnet, said armature acted upon by the energizing of said magnet to permit the passage of light through said opening, said spring arm returning said armature to its normal position upon de-energizing of the magnet, and adjustable means supporting said lens to permit movement of the lens towards or away from the light projecting means.

2. In an optical telegraph, the combination, of light projecting means, a lens, a wall between said light projecting means and lens and provided with a light directing opening, a spring arm, an armature carried by said spring arm and normally preventing the passage of light through said opening, an electric magnet, said armature acted upon by the energizing of said magnet to permit the passage of light through said opening, said spring arm returning said armature to its normal position upon de-energizing of the magnet, adjustable means supporting said lense to permit movement of the lense towards or away from the light projecting means, and adjustable means for limiting the movement of said armature.

3. In an optical telegraph, the combination, of light projecting means, a lens, a wall between said light projecting means and lens and provided with a light directing opening, a spring arm, an armature carried by said spring arm and normally preventing the passage of light through said opening, an electro-magnet, a sending key in circuit with the magnet for controlling the energizing of the magnet, said armature moved by energizing of said magnet to permit the passage of light through said opening, said spring arm returning said armature to its normal position upon the de-energizing of said magnet, adjustable means for limiting the return movement of said armature, and adjustable means supporting said lens to permit movement of said lens towards or away from said light projecting means.

4. In an optical telegraph, the combination, of a supporting standard, a longitudinal casing pivotally supported by said supporting standard, said longitudinal casing having formed therein upon one end a lamp and a reflector, an adjustable lens carried by the other end of the casing, a wall between said lamp, and lens provided with an opening therein to permit the passage of light rays therethrough for reflection upon the lens, a lever movably mounted upon said casing for normally closing said opening, and an electromagnet positioned to attract said lever upon energizing the same to permit the passage of light through the opening.

5. In an optical telegraph, the combination, of a supporting standard, a longitudinally extending casing, pivotally connected to said supporting standard, a lamp disposed within said longitudinal casing, an adjustable lens connected to an end of said casing, and remote from said lamp, a partition intermediate said lamp and said lens, having an aperture therein for the reflection of the light therethrough upon the lens, a lever movably mounted within said casing and normally closing said aperture to prevent reflection of the light therethrough, an auxiliary casing extending laterally from said pivotally mounted casing, an electromagnet disposed within said auxiliary casing, said electromagnet positioned to attract said lever upon energizing of the former to permit the passage of light through said opening.

6. In an optical telegraph, the combination, of a supporting standard, a longitudinally extending casing, pivotally connected to said supporting standard, a lamp disposed within said longitudinal casing, an adjustable lens connected to an end of said casing, and remote from said lamp, a partition intermediate said lamp and said lens, having an aperture therein for the reflection of the light therethrough upon the lens, an armature mounted within said casing and normally closing said aperture to prevent reflection of the light therethrough, an auxiliary transversely extending casing extending laterally from said pivotally mounted casing, an electromagnet disposed within said auxiliary casing, said electromagnet positioned to attract said armature upon energizing of the former to permit the passage of light through said opening, and adjustable means for regulating the amplitude of movement of said armature.

7. In an optical telegraph, the combination, of a supporting platform, a standard mounted upon said supporting platform, a casing pivotally mounted upon said standard, a lamp mounted within an end of said casing, an adjustable lens disposed upon an end of said casing remote from said lamp, a partition having an aperture therein disposed within said casing and intermediate the lamp and lens, an armature normally preventing reflection of light through the opening upon the lens, and an electromagnet carried by said casing to attract said armature to permit reflection of light through said aperture.

8. In an optical telegraph, the combination, of a supporting platform, a standard mounted upon said supporting platform, a casing pivotally mounted upon said standard, a lamp mounted within an end of said casing, a lens adjustably mounted on one end of said casing remote from said lamp, a partition having an aperture therein disposed intermediate said lamp and lens, a movably mounted lever adapted to normally close said opening, an auxiliary casing extending transversely from said pivotally mounted casing, an electromagnet disposed within said casing and adapted upon the energizing thereof to attract the movable lever to swing the same away from the opening to permit reflection of the light rays therethrough upon the lens, adjusting means for limiting the amplitude of movement of said lever, and an operating key mounted upon said supporting platform in circuit with said electromagnet.

ARTHUR H. MATTHEWS.

Witnesses:
  WILLIAM W. HEARD,
  MAS BAGMANN.

| Bock, | 364,472 | 178-90 |
| Meloney, | 343,468 | 178-100 |
| Hatmakee, | 650,836 | 178-98 |
| Martin, | 767,303 | 178-82 |
| Ybarrondo, | 901,861 | 178-98 |
| Bock, | 364,471 | 178-90 |
| Cerebotani, | 758,302 | 178-90 |
| Armstrong, | 844,080 | 178-90 |
| Schloemilch, | 958,181 | 178-90 |